(12) United States Patent
Brown

(10) Patent No.: US 10,704,673 B1
(45) Date of Patent: Jul. 7, 2020

(54) TRANSMISSION WITH CONFIGURABLE SHIFTER

(71) Applicant: Midwest Truck & Auto Parts, Inc., Chicago, IL (US)

(72) Inventor: Greg Brown, Chicago, IL (US)

(73) Assignee: MIDWEST TRUCK & AUTO PARTS, INC., Chicago, IL (US)

( * ) Notice: Subject to any disclaimer, the term of this patent is extended or adjusted under 35 U.S.C. 154(b) by 0 days.

(21) Appl. No.: 16/589,298

(22) Filed: Oct. 1, 2019

(51) Int. Cl.
F16H 59/04 (2006.01)
F16H 59/02 (2006.01)

(52) U.S. Cl.
CPC ..... *F16H 59/04* (2013.01); *F16H 2059/0269* (2013.01)

(58) Field of Classification Search
CPC .......................... F16H 59/04; F16H 2059/0269
See application file for complete search history.

(56) References Cited

U.S. PATENT DOCUMENTS

| | | | |
|---|---|---|---|
| 4,287,780 A | 9/1981 | Poling | |
| 4,333,360 A | 6/1982 | Simmons | |
| 4,515,032 A | 5/1985 | Olmsted | |
| 4,569,245 A | 2/1986 | Feldt et al. | |
| 4,581,951 A | 4/1986 | Watson | |
| 5,272,931 A * | 12/1993 | Daniel | F16H 59/042 74/473.1 |
| 5,592,856 A | 1/1997 | Parsons | |
| 5,907,975 A | 6/1999 | Giaimo | |
| 5,941,123 A * | 8/1999 | Numakami | B60K 20/04 74/18 |
| 5,950,493 A * | 9/1999 | Pritchard | F16H 59/042 74/473.33 |
| 6,029,535 A * | 2/2000 | Kenny | F16H 59/0278 403/349 |
| 6,142,034 A * | 11/2000 | Rempinski | F16H 59/042 403/56 |
| 6,318,209 B1 | 11/2001 | Park | |
| 7,000,497 B1 * | 2/2006 | Campbell | F16H 59/0278 74/525 |

(Continued)

OTHER PUBLICATIONS

Tremec Transmissions Technologies Corp., TR-3550/TKO Parts Manual; Bulletin No. TRPM-TKO-0711; Jan. 2007; Tremec Transmissions Technologies Corp.; Plymouth, Michigan.

(Continued)

*Primary Examiner* — David M Fenstermacher
(74) *Attorney, Agent, or Firm* — Patzik, Frank & Samotny Ltd.

(57) ABSTRACT

A manual transmission includes a housing having a longitudinal axis and an aperture, and a shift lever assembly comprising a shift lever having a pivot ball. At least three shift lever sockets are coaxially disposed along the longitudinal axis and within the aperture, with each of the at least three shift lever sockets being configured to receive the pivot ball therein when the shift lever is disposed at a corresponding, different discrete longitudinal position along an axis parallel to the longitudinal axis of the housing. A first shift lever assembly comprises a cover plate and a shift tower supporting the shift lever, wherein the shift tower is substantially centered within a periphery of the cover plate. A second shift lever assembly has a shift tower offset from a center of the periphery of the cover plate.

14 Claims, 4 Drawing Sheets

(56) References Cited

U.S. PATENT DOCUMENTS

| | | | |
|---|---|---|---|
| 7,464,621 B2 | 12/2008 | Mathis et al. | |
| 7,854,181 B2 | 12/2010 | Ciamillo | |
| 8,375,821 B2 * | 2/2013 | gr. Kohorst | F16C 11/0638 |
| | | | 403/141 |
| 8,418,578 B2 * | 4/2013 | Armitage | F16H 59/0278 |
| | | | 74/473.35 |
| 9,273,775 B2 * | 3/2016 | Kvarnstrom | F16H 59/105 |
| 9,316,306 B2 * | 4/2016 | Okumoto | F16H 59/10 |
| 9,506,556 B1 * | 11/2016 | Fredrick | F16H 59/0278 |
| 10,100,920 B2 * | 10/2018 | Min | F16H 59/0204 |
| 10,198,024 B2 * | 2/2019 | Fryer | B60K 20/04 |
| 2003/0213326 A1 * | 11/2003 | Fett | F16H 59/04 |
| | | | 74/473.3 |
| 2008/0115612 A1 * | 5/2008 | Kumagai | F16H 59/04 |
| | | | 74/473.3 |

OTHER PUBLICATIONS

Tremec Transmissions Technologies Corp., Mid-Shift Conversion Kit for TKO-500 & TKO-600 30-17-4X, Disassembly and Assembly Instructions; Bulletin No. TRAM-008-0107; Jul. 2007; Tremec Transmissions Technologies Corp.; Plymouth, Michigan.

* cited by examiner

US 10,704,673 B1

TRANSMISSION WITH CONFIGURABLE SHIFTER

BACKGROUND OF THE INVENTION

1. Field of the Invention

The present invention relates, in general, to vehicular drivetrains and, more particularly, to shift mechanisms for manual automotive transmissions.

2. Description of Related Art

Automotive transmissions are commonly used to transfer rotational power from an output shaft of an engine to a driveshaft assembly and associated driven wheels of a vehicle. Such transmissions typically include a housing, or transmission case, containing a plurality of intermeshing gears of various sizes and numbers of teeth, so at to provide a variety of selectable gear ratios. The selection of appropriate gear ratios at appropriate times enables smooth acceleration and smooth power transfer from the engine to the driven wheels.

One form of automotive transmission is a manual shift transmission. In a manual shift transmission, a driver grasps and pivots a shift lever in order to move associated shift rods or shift rails and associated shift forks. This, in turn, causes differing gears within the transmission's housing to become meshed together between input and output shafts of the transmission. In this manner, various gears ratios, typically assigned consecutive numerical values, may be manually selected for operation.

Depending upon the particular automotive application, as well as the physical size and personal preference of a particular driver, it is often desirable to locate, or customize the location of, a shift lever for a manual transmission at various positions along the axial length of the transmission. An example of a manual shift automotive transmission having a positionable or configurable shifter location is the TKO series of 5-speed transmissions from Transmisiones y Equipos Mecánicos, S.A. de C.V., commonly known as Tremec®. These transmissions include a rear extension housing having both a mid-shift aperture and a rear shift aperture, each of which can accommodate a shift lever. Moreover, the rear shift aperture of TKO manual transmissions commonly includes a dual shift lever socket, having two collinearly arranged sockets, either of which can alternatively receive and accommodate a pivot ball at the base of an associated shift lever assembly.

An example of a prior art shift lever assembly configured for use with a TKO series manual transmission is disclosed in U.S. Pat. No. 8,418,578 to Armitage, the entirety of which is hereby incorporated by reference. These prior art shift lever assemblies commonly include a cover plate having six attachment apertures, aligned in two parallel rows of three apertures each, configured to align with six threaded apertures surrounding the perimeter of the rear shift aperture of the rear extension housing of TKO series transmissions. These prior art shift levers further typically include a shift lever-supporting shift tower that is offset to one side of, rather than centered, relative to the generally rectangular surface of the cover plate of the shift lever assembly.

This offset configuration of these prior art shift towers relative to their cover plates enables the shift lever assembly to be affixed to the rear shift aperture of the rear housing extension in either of two alternative configurations. In a first configuration, the shift tower (and, in turn the associated shift lever) is disposed towards the front of the housing extension, with the pivot ball of the shift lever received by and engaging the forward-most socket of the dual shift lever socket. In a second configuration, the shift tower (and, in turn the associated shift lever) is disposed towards the rear of the housing extension, with the pivot ball of the shift lever received by and engaging the rear-most socket of the dual shift lever socket. In this manner, the manual transmission may be assembled in a selected one of two available configurations that is better suited for a particular automotive application, physical size of the driver, and/or the driver's personal preference.

While the prior art TKO manual transmissions provide a certain amount of configurability and adjustability, relative to the axial positioning of the manual shift lever, there is a need or desire for even further adjustability. Accordingly, it is an object of the present invention to provide a manual transmission having a manual shift lever that is capable of being configured or positioned in additional axial locations, relative to certain prior art manual transmissions and prior art shift lever assemblies.

These and other objects and features of the present invention will become apparent in view of the present specification, drawing and claims.

BRIEF SUMMARY OF THE INVENTION

The present invention comprises an automotive manual transmission having a transmission case containing a plurality of movable gears of various sizes for creating a plurality of gear ratios between an input shaft and an output shaft of the transmission. The transmission includes a rear extension housing having a mid-shift aperture and a rear shift aperture, both capable of alternatively accommodating a manual shift lever assembly. The rear shift aperture includes eight threaded holes, arranged in two parallel, generally evenly-spaced groups of four threaded holes for the threaded engagement of mounting bolts.

Within the rear housing extension, a triple shift lever socket is accessible through the rear shift aperture. The triple shift lever socket includes a longitudinal channel and is affixed to a main shift rod using conventional roll pins by extending a portion of the main shift rod through the longitudinal channel until affixation apertures in both the main shift rod and the triple shift lever sockets are aligned for insertion of the roll pins. The main shift rod, supported by roller bearings, is coupled to a shift selector finger. Axial and rotational movement of triple shift lever socket, imparted by movement by the driver of an associated shift lever assembly, results in corresponding movement of the shift selector finger. This, in turn, selects an appropriate gear reduction within the transmission case to, in turn, place the manual transmission into a desired gear.

The triple shift lever socket is preferably integrally formed as a unit and includes three colinear sockets, each configured to accept a pivot ball disposed at the bottom of a shift lever assembly. Each of these sockets includes an associated bushing to reduce the friction between the socket and an associated pivot ball of a shift lever assembly.

A center shift lever assembly is configured to engage a center socket of the triple shift lever socket upon attachment of the cover plate of the center shift lever assembly to the rear shift aperture of the rear extension housing of the transmission.

An offset shift lever assembly is configured to engage either the forward or rear socket of the triple shift lever socket upon attachment of the cover plate of the offset shift lever assembly to the rear shift aperture of the rear extension housing of the transmission. Upon attachment of the offset shift lever assembly in a first orientation, with its shift tower disposed towards the front of the overall transmission, the pivot ball of the shift lever assembly engages the forward socket of the triple shift lever socket. Upon attachment of the offset shift lever assembly in a second orientation, with its shift tower disposed towards the rear of the overall transmission, the pivot ball of the shift lever assembly engages the rear socket of the triple shift lever socket. Thus, by properly selecting and positioning either a center shift lever assembly or an offset shift lever assembly, the shift lever may be positioned, as desired, at any one of three axial positions along the longitudinal axis of manual transmission.

The center shift lever assembly includes a center cover plate having eight attachment apertures, arranged in two parallel, generally evenly-spaced holes, with the same positioning and alignment as the threaded holes of the rear extension housing about the perimeter of the rear shift aperture, permitting the extension of mounting bolts through the attachment apertures of the center cover plate and into threaded engagement with the threaded holes about the rear shift aperture of the rear extension housing.

The center shift lever assembly further includes a center shift tower disposed about the centroid, or geometric center of the center cover plate. The center shift tower includes a main aperture and two opposing threaded channels. A shift lever includes a handle attachment portion, fulcrum, fulcrum pins, and pivot ball. The shift lever is coupled to the center shift lever assembly by inserting the pivot ball through the main aperture until the fulcrum ball engages a seat within the main aperture, and the fulcrum pins each become fully seated within an associated threaded channel. A tensioning seat is disposed in each threaded channel, directly above an associated fulcrum pin, and a tensioning spring is disposed immediately above each tensioning seat. Tensioning screws threadedly engage each threaded channel, and are tightened to create a desired degree of tension upon each fulcrum pin, sandwiched between respective tensioning seats and bottom seats of the threaded channels.

Upon attachment of the center shift lever to the rear shift aperture, the center shift tower is generally centered above the aperture, and the pivot ball of the shift lever is positioned to be received by a socket bushing disposed within the center socket if the triple shift lever socket.

The offset shift lever assembly is generally similar in construction to the center shift lever assembly, except that the offset shift tower is not positioned at the centroid or geometric center of the offset cover plate. Rather, the offset shift tower is linearly offset and positioned towards one end of the generally rectangular offset cover plate.

The offset shift lever assembly may be coupled to the rear shift aperture of the rear housing extension in two orientations. In a first orientation, the offset shift tower is disposed towards the front of the transmission and, upon attachment, the pivot ball of the shift lever is positioned to be received by a socket bushing disposed within the forward socket of the triple shift lever socket. In a second orientation, the offset shift tower is disposed towards the rear of the transmission and, upon attachment, the pivot ball of the shift lever is positioned to be received by a socket bushing disposed within the rear socket of the triple shift lever socket.

As can be seen, by selecting either the center shift lever assembly or the offset shift lever assembly for attachment to the rear shift aperture of the rear extension housing of the transmission, and, if the offset shift lever is selected, by attaching the assembly with the offset shift tower in either the forward or rear orientation, the shift lever may be disposed at one of three positions along the longitudinal axis of the transmission, by engaging a selected socket of the triple shift lever socket.

DETAILED DESCRIPTION OF THE INVENTION

Figure 1:
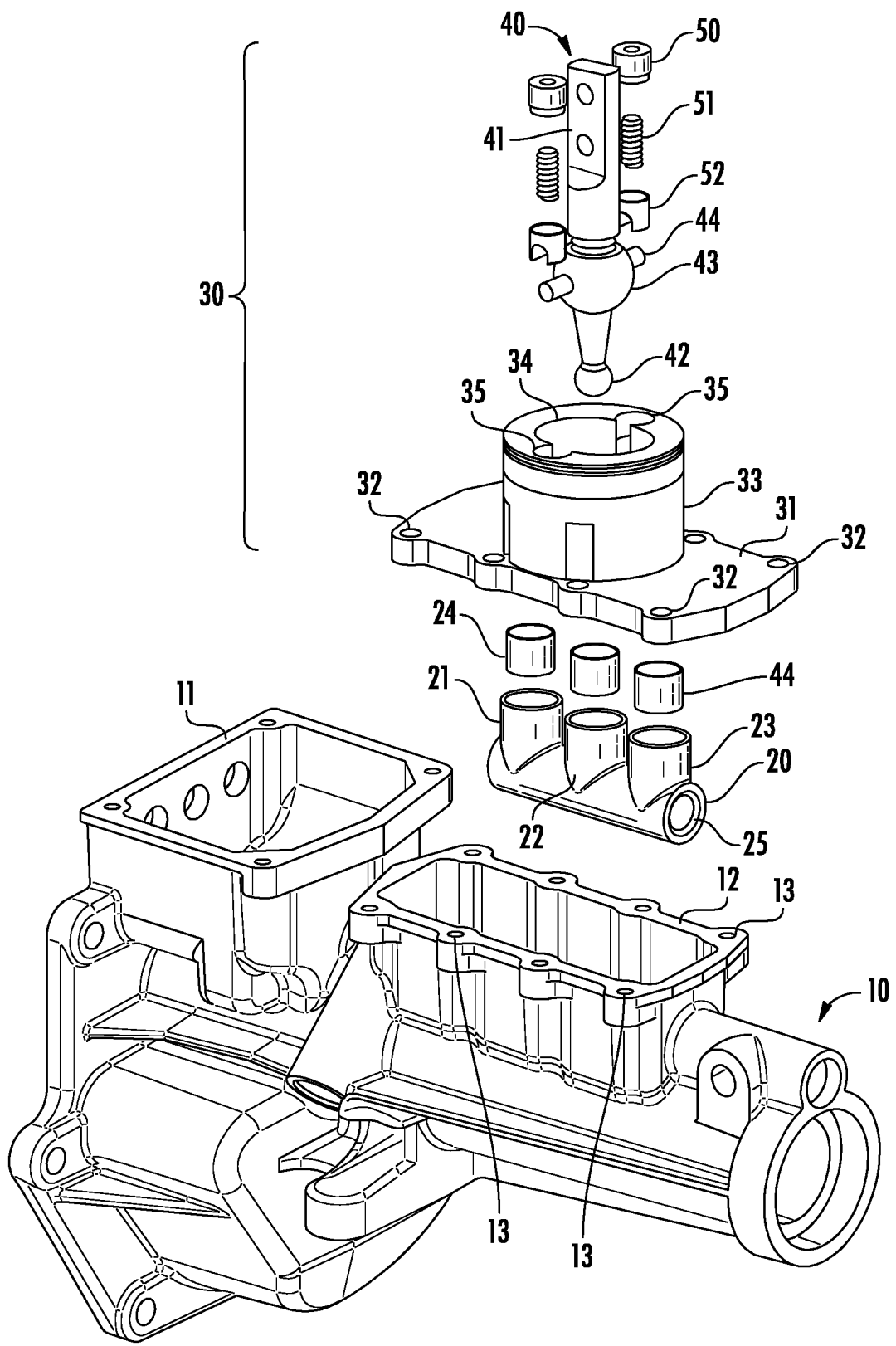
FIG. 1 is an exploded perspective view of a manual transmission rear extension housing, triple shift lever socket, and center shift lever assembly of the present invention.

While the present invention is susceptible of embodiment in many different forms, there is shown in the drawings and will herein be described in detail one specific embodiment, with the understanding that the present disclosure is intended as an exemplification of the principles of the present invention and is not intended to limit the invention to the embodiment disclosed.

Manual transmission rear extension housing 10 is shown in FIG. 1 as comprising mid-shift aperture 11 and rear shift aperture 12. While not highly pertinent to the present invention, mid-shift aperture 11 provides an additional, more forwardly positioned location along the longitudinal axis of the manual transmission where a manual shift assembly may alternatively be positioned, if desired for certain applications. Eight threaded holes 13, arranged in two parallel rows of four evenly spaced threaded holes each, are disposed about the perimeter of the rear shift aperture, permitting center shift lever assembly 30 (or offset shift lever assembly 30') to be coupled to rear extension housing 10 atop rear shift aperture 12.

Triple shift lever socket 20 is disposed within rear extension housing 10 and is accessible through rear shift aperture 12. Triple shift lever socket 20 comprises three integrally formed, colinearly oriented, vertically extending sockets, namely forward socket 21, center socket 22 and rear socket 23, each configured to receive a pivot ball of an associated shift lever assembly. Each of forward socket 21, center socket 22, and rear socket 23 has an associated socket bushing 24 disposed therein. Each socket bushing 24 is generally cylindrical, and may have a closed, generally circular bottom. Each socket bushing 24 may be constructed of plastic, polytetrafluoroethylene, or another suitably durable and low friction material. Triple shift lever socket 20 further includes a longitudinal channel facilitating its affixation to a main shift rod or rail.

As further shown in FIG. 1, center shift lever assembly 30 comprises center cover plate 31, having eight attachment apertures 32, arranged in two parallel rows of four evenly spaced apertures about the perimeter of center cover plate 31. The pattern of attachment apertures 32 disposed about center cover plate 31 corresponds to the pattern of threaded holes 13 disposed about rear shift aperture 12, permitting mounting bolts (not shown) to be extended through each attachment aperture 32 and received by each threaded hole 13, to affix center shift lever assembly 30 to rear extension housing 10 atop rear shift aperture 12.

Referring further to FIG. 1, center shift tower 33 extends vertically from center cover plate 31 and is disposed about the centroid, or geometric center of center cover plate 31. Center shift tower 31 includes main aperture 34 and two opposing threaded channels 35, each in communication with main aperture 34. Shift lever 40 comprises handle attachment portion 41 disposed at its top end, pivot ball 42 disposed at its bottom end, and generally spherical fulcrum 43 disposed therebetween. Two fulcrum pins 44 extend from opposing sides of fulcrum 43.

Shift lever 40 is movably affixed to center shift tower 33 by inserting pivot ball 42 into main aperture 34 until fulcrum 43 engages a generally hemispherical seat within main aperture 34, and each fulcrum pin 44 becomes disposed within and becomes fully seated upon a supporting surface within an associated threaded channel 35. A tensioning seat 52 is disposed within each threaded channel 35, directly above an associated fulcrum pin 44, and a tensioning spring 51 is disposed immediately above each tensioning seat 52. Tensioning screws 50 threadedly engage each threaded channel 35, and are tightened to create a desired degree of tension upon each fulcrum pin 44, sandwiched between respective tensioning seats 52 and bottom seat surfaces of threaded channels 35.

Upon attachment of center shift lever assembly 30 to the rear shift aperture 12 using eight suitable mounting bolts, center shift tower 33 is positioned in a generally centered orientation above rear aperture 12, and pivot ball 42 of shift lever 40 is movably positioned within and received by a socket bushing 24 disposed within center socket 22 of triple shift lever socket 20.

Figure 2:
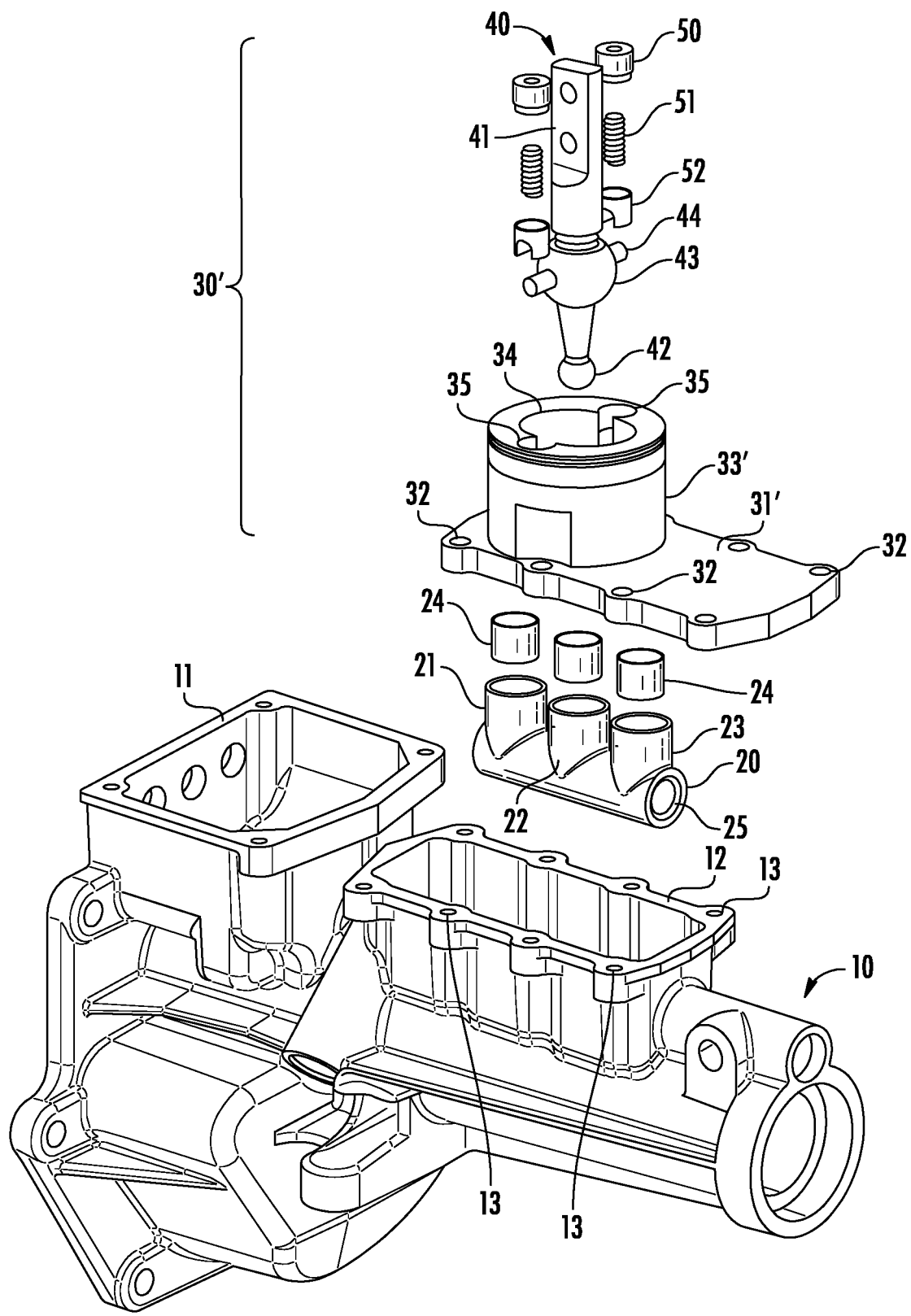
FIG. 2 is an exploded perspective view of a manual transmission rear extension housing, triple shift lever socket, and offset shift lever assembly of the present invention, showing the offset shift tower in a first, forward orientation.
Figure 3:
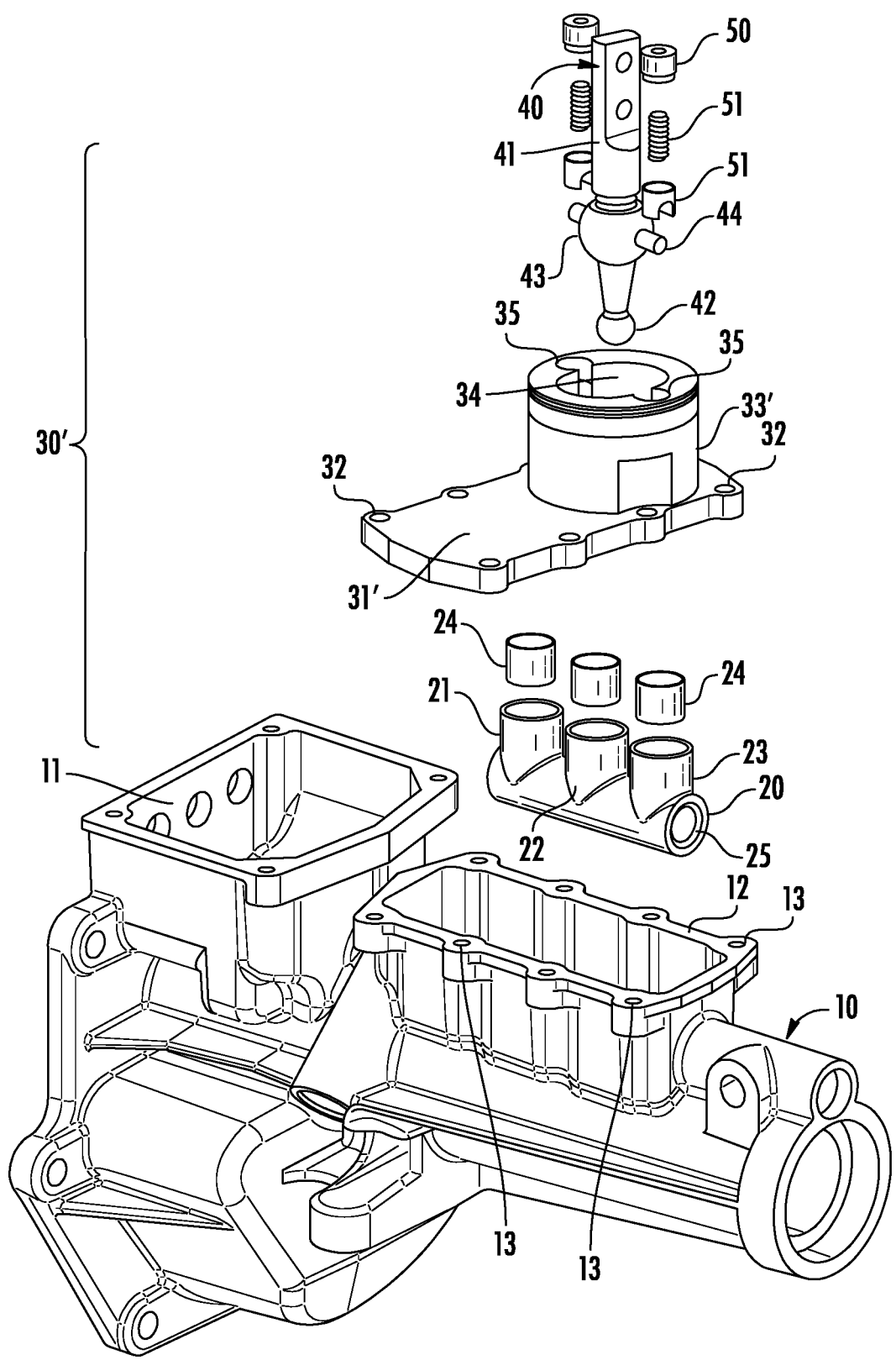
FIG. 3 is an exploded perspective view of a manual transmission rear extension housing, triple shift lever socket, and offset shift lever assembly of the present invention, showing the offset shift tower in a second, rear orientation.

Referring to FIGS. 2 and 3, offset shift lever assembly 30' is generally similar in construction to center shift lever assembly 30, except that offset shift tower 33' of offset shift lever assembly 30' is not positioned at the centroid or geometric center of offset cover plate 31'. Rather, offset shift tower 33' is longitudinally offset and positioned towards one end of generally rectangular offset cover plate 31'.

Offset shift lever assembly 30' may be coupled to rear shift aperture 12 of rear extension housing 10 in two differing orientations. In a first orientation, and as shown in FIG. 2, offset cover plate 31' is oriented with offset shift tower 33' disposed towards the front of rear shift aperture 12 and, upon attachment of offset shift lever assembly 30' atop rear shift aperture 12, pivot ball 42 of shift lever 40 is movably positioned within and received by a socket bushing 24 disposed within forward socket 21 of triple shift lever socket 20. In a second orientation, and as shown in FIG. 3, offset cover plate 31' is oriented with offset shift tower 33' disposed towards the rear of rear shift aperture 12 and, upon attachment of offset shift lever assembly 30' atop rear shift aperture 12, pivot ball 42 of shift lever 40 is movably positioned within and received by a socket bushing 24 disposed within rear socket 23 of triple shift lever socket 20.

As can be seen, by selecting either center shift lever assembly 30 or offset shift lever assembly 30' for attachment to rear shift aperture 12 of rear extension housing 10 and, if offset shift lever assembly 30' is selected, by attaching the assembly with offset shift tower 33' in either the forward or rear orientation, shift lever 40 and its pivot ball 42 may be disposed at any one of three positions along the longitudinal axis of the transmission, by engaging a selected one of the three coaxially aligned sockets of triple shift lever socket 20.

Figure 4:
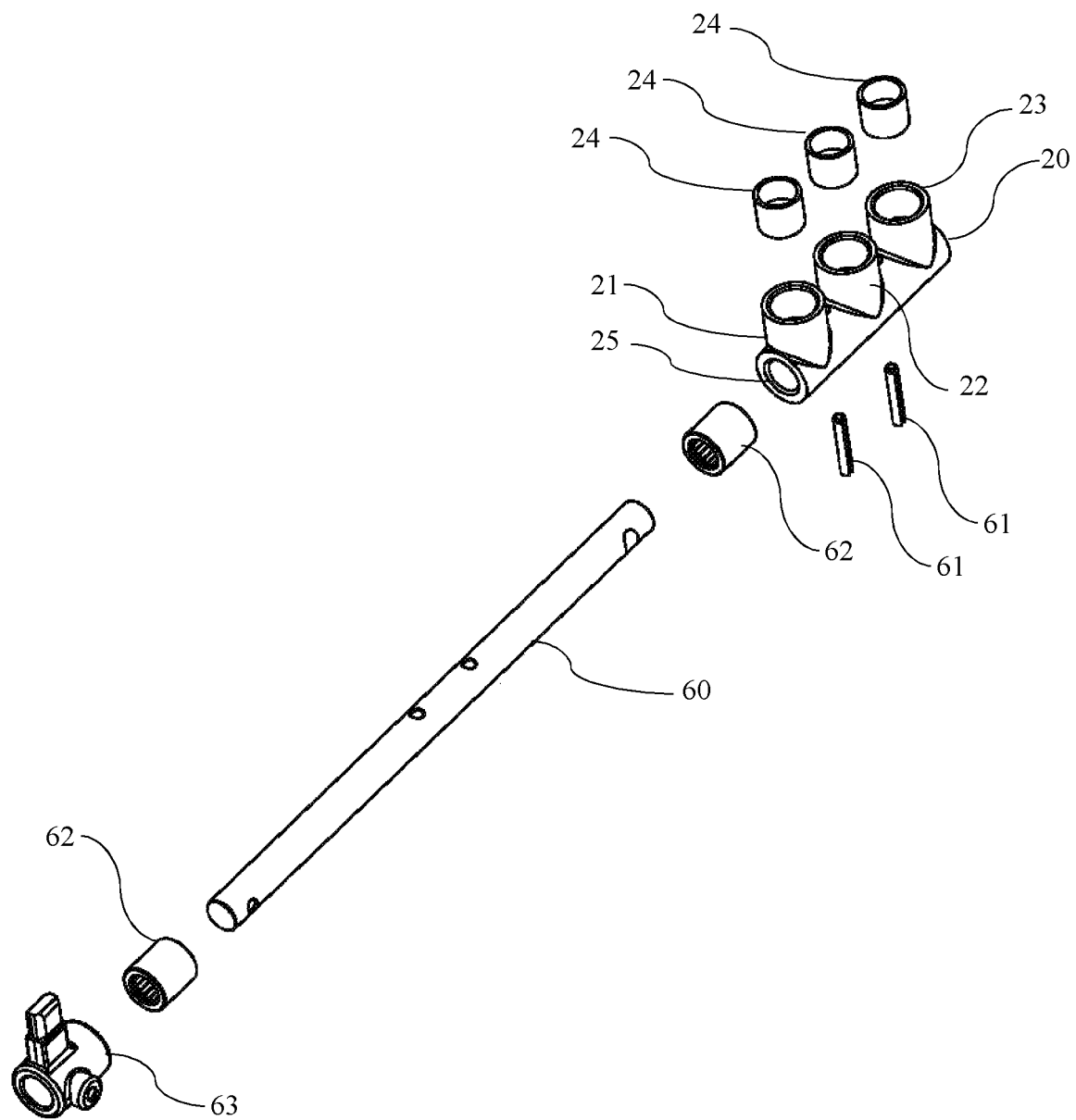
FIG. 4 is an exploded perspective view of the main shift rod assembly.

Referring to FIG. 4, the main shift rod assembly includes triple shift lever socket 20 affixed to main shift rod 60 using conventional roll pins 61 by extending a portion of main shift rod 60 through longitudinal channel 25 of triple shift lever socket 20 until affixation apertures of both main shift rod 60 and triple shift lever socket 20 are aligned, and then advancing a roll pin 60 through each aligned group of affixation apertures. Main shift rod 60 and, in turn, triple shift lever socket 20 are supported by roller bearings 62. Shift selector finger 63 is coupled to a forward end of main shift rod 60 to complete the main shift rod assembly. As a result, axial and rotational movements of triple shift lever socket 20, imparted by corresponding movements of shift lever 40 made by the driver, are transmitted from triple shift lever socket 20 to shift selector finger 63 by main shift rod 60. This movement of shift selector finger 63, in turn, causes movements of the meshing gears within the manual transmission case in order to create a desired gear reduction within the transmission case, placing the manual transmission into a desired gear.

The present manual transmission may be manufactured and sold as a unit with an associated shift mechanism, which may comprise a selected one of center shift lever assembly 30 and offset shift lever assembly 30', with the associated shift lever assembly installed in one of the three potential positions described above. Alternatively, the present manual transmission may be sold as a kit consisting of the transmission housing, main shift rod assembly, and both the center shift lever assembly and the offset shift lever assembly, enabling the purchaser to attach either the center shift lever assembly or the offset shift lever assembly to the rear shift aperture of the rear extension housing, in any of the three potential positions described above. Moreover, to complement manual transmissions previously assembled and sold as a unit with only one of the center shift lever assembly and the offset shift lever assemblies, the center shift lever assembly and the offset shift lever assembly may further be sold separately, enabling owners of transmissions according to the present invention to further adjust and modify the longitudinal positioning of their manual shift lever.

The preceding description and drawings merely explain the invention and the invention is not limited thereto, as those of ordinary skill in the art who have the present disclosure before them will be able to make changes and variations thereto without departing from the scope of the present invention.

What is claimed is:
1. A manual transmission comprising:
a housing having a longitudinal axis and an aperture;
a shift lever assembly comprising a shift lever having a pivot ball; and
at least three shift lever sockets coaxially disposed along the longitudinal axis and within the aperture, each of the at least three shift lever sockets being configured to receive the pivot ball therein when the shift lever is attached to the housing at a corresponding, different discrete longitudinal position along an axis parallel to the longitudinal axis of the housing.

2. The manual transmission according to claim 1, wherein the at least three shift lever sockets comprise an integrally formed unit.

3. The manual transmission according to claim 1, wherein the shift lever assembly comprises a cover plate and a shift tower supporting the shift lever, and wherein the shift tower is substantially centered within a periphery of the cover plate.

4. The manual transmission according to claim 3, wherein, upon attachment of the shift lever assembly to the housing, the pivot ball is received by a center socket of the at least three shift lever sockets.

5. The manual transmission according to claim 1, wherein the shift lever assembly comprises a cover plate and a shift tower supporting the shift lever, and wherein the shift tower is offset from a center of a periphery of the cover plate.

6. The manual transmission according to claim 5, wherein the shift lever assembly is attachable to the housing in a first orientation and a second orientation;
   wherein, upon attachment of the shift lever assembly to the housing in the first orientation, the pivot ball is received by a forward socket of the at least three shift lever sockets; and
   wherein, upon attachment of the shift lever assembly to the housing in the second orientation, the pivot ball is received by a rear socket of the at least three shift lever sockets.

7. A shift mechanism for a manual transmission, the manual transmission having a housing having a longitudinal axis and an aperture, the shift mechanism comprising:
   a shift lever assembly comprising a shift lever having a pivot ball; and
   at least three shift lever sockets coaxially disposed along the longitudinal axis and within the aperture, each of the at least three shift lever sockets being configured to receive the pivot ball therein when the shift lever is disposed at a corresponding, different discrete longitudinal position along an axis parallel to the longitudinal axis of the housing.

8. The shift mechanism according to claim 7, wherein the at least three shift lever sockets comprise an integrally formed unit.

9. The shift mechanism according to claim 7, wherein the shift lever assembly comprises a cover plate and a shift tower supporting the shift lever, and wherein the shift tower is substantially centered within a periphery of the cover plate.

10. The shift mechanism according to claim 9, wherein, upon attachment of the shift lever assembly to the housing, the pivot ball is received by a center socket of the at least three shift lever sockets.

11. The shift mechanism according to claim 7, wherein the shift lever assembly comprises a cover plate and a shift tower supporting the shift lever, and wherein the shift tower is offset from a center of a periphery of the cover plate.

12. The shift mechanism according to claim 11, wherein the shift lever assembly is attachable to the housing in a first orientation and a second orientation;
   wherein, upon attachment of the shift lever assembly to the housing in the first orientation, the pivot ball is received by a forward socket of the at least three shift lever sockets; and
   wherein, upon attachment of the shift lever assembly to the housing in the second orientation, the pivot ball is received by a rear socket of the at least three shift lever sockets.

13. A kit comprising:
   a manual transmission having a housing having a longitudinal axis and an aperture;
   a first shift lever assembly comprising a first shift lever having a first pivot ball, wherein the first shift lever assembly comprises a first cover plate and a first shift tower supporting the first shift lever, and wherein the first shift tower is substantially centered within a periphery of the first cover plate;
   a second shift lever assembly comprising a second shift lever having a second pivot ball, wherein the second shift lever assembly comprises a second cover plate and a second shift tower supporting the second shift lever, and wherein the second shift tower is substantially offset from a center of a periphery of the second cover plate;
   at least three shift lever sockets coaxially disposed along the longitudinal axis and within the aperture;
   wherein, upon attachment of the first shift lever assembly to the aperture of the housing, the first pivot ball is received by a center socket of the at least three shift lever sockets; and
   wherein, upon attachment of the second shift lever assembly to the aperture in a first orientation, the second pivot ball is received by a forward socket of the at least three shift lever sockets; and
   wherein, upon attachment of the second shift lever assembly to the aperture in a second orientation, the second pivot ball is received by a rear socket of the at least three shift lever sockets.

14. The kit according to claim 13, wherein the at least three shift lever sockets comprise an integrally formed unit.

* * * * *